UNITED STATES PATENT OFFICE.

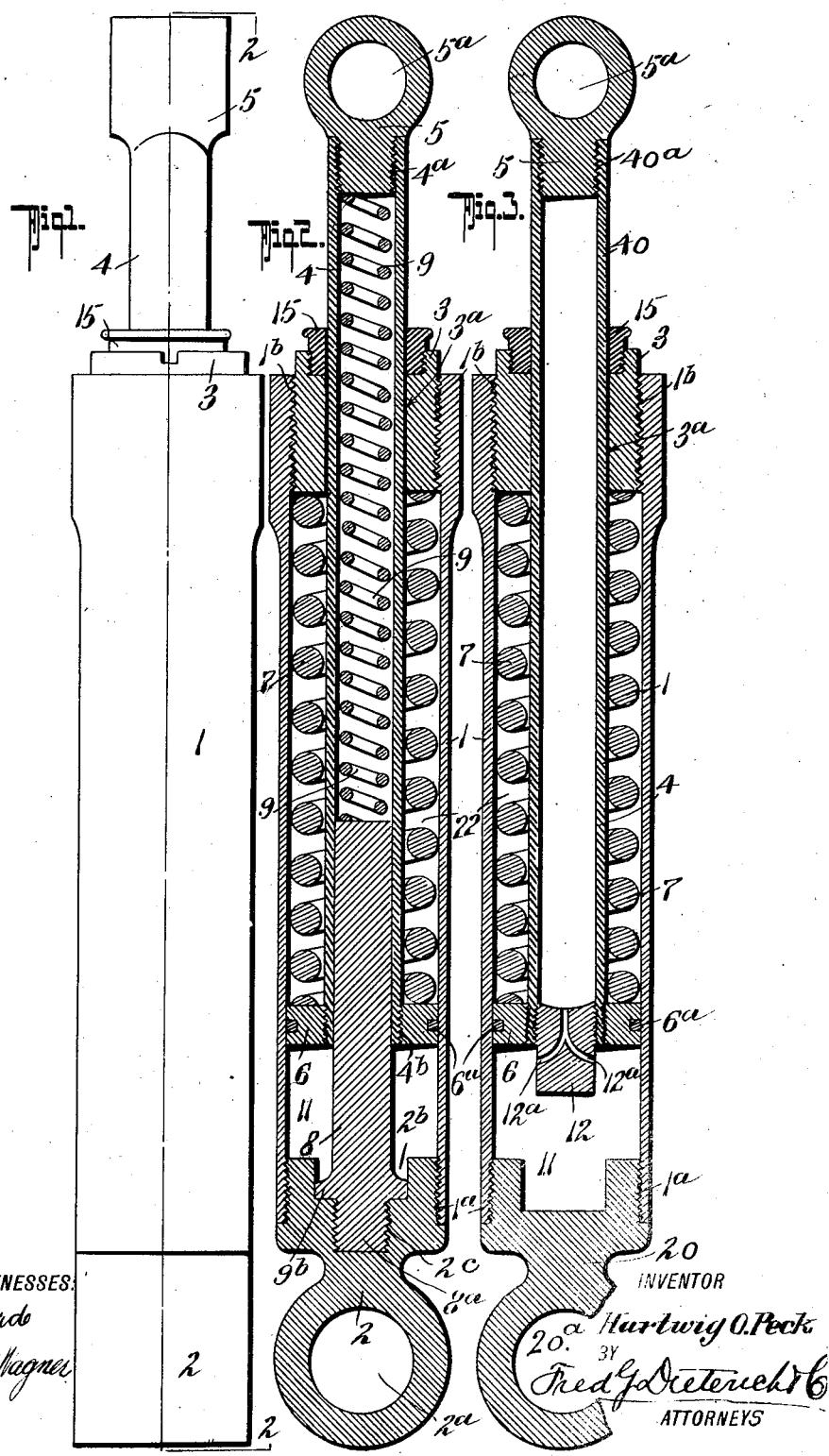

HARTWIG O. PECK, OF PORTLAND, OREGON, ASSIGNOR TO H. O. PECK AUTOMOBILE WHEEL COMPANY, OF PORTLAND, OREGON, INCORPORATED.

SPOKE FOR VEHICLE-WHEELS.

934,566.

Specification of Letters Patent. Patented Sept. 21, 1909.

Application filed March 9, 1909. Serial No. 482,230.

*To all whom it may concern:*

Be it known that I, HARTWIG O. PECK, residing at Portland, in the county of Multnomah and State of Oregon, have invented certain new and useful Improvements in Spokes for Vehicle-Wheels, of which the following is a specification.

My invention relates to an improved construction of spoke for spring wheels and in its generic nature resides in providing a spoke consisting of a tubular or casing section and a tubular rod section carrying a packed piston to separate the casing into two air chambers in one of which a spring is contained. The other chamber serves as a container for air to form a pneumatic cushion. The tubular rod section is also provided with a spring to counterbalance the spring in the casing to a predetermined degree, and the piston carried by the casing projects into the tubular rod section to be engaged by the spring thereon, the piston fitting the rod snugly so as to form an air cushion to assist in checking violent movements of the two sections of the spoke.

More specifically my invention embodies those novel details of construction, combination and arrangement of parts all of which will be first fully described, then be specifically pointed out in the appended claims, and illustrated in the accompanying drawings, in which:

Figure 1, is a side elevation of a spoke embodying my invention. Fig. 2, is a central, vertical, longitudinal section on the line 2—2 of Fig. 1. Fig. 3, is a central, vertical, longitudinal section of a modified form of my invention.

Referring now to the accompanying drawings, in which like letters and numerals of reference indicate like parts in all of the figures, 1 designates the tubular casing, one end of which is threaded as at $1^a$ to receive the plug 2 which has a bearing $2^a$ to receive a securing pin, by means of which the spoke may be secured to the hub or rim of the wheel, as the case may be. The plug 2 has a chamber $2^b$ merging with a countersunk threaded portion $2^c$ to receive a fixed piston 8 having a flange $9^b$ to seat in the chamber $2^b$, and a threaded shank $8^a$ to engage the threaded portion $2^c$ of the plug 2. The other end of the casing 1 is threaded as at $1^b$ to receive the adjusting closure plug 3 that is centrally apertured at $3^a$ to permit passage of the tubular rod section 4 of the spoke. A packing bushing 15, of fibrous, or other suitable material, is threaded into the plug 3 around the rod section 4, as shown in the drawings.

The outer end of the rod section 4 is closed by a plug 5 threaded at $4^a$ into the rod section to form a closure therefor, the plug 5 being apertured as at $5^a$ to receive a pivot bolt, by means of which the same may be secured to the hub or rim of a wheel, as the case may be.

Within the casing 1 the tubular rod section 4 carries a piston 6 that is threaded at $4^b$ onto the end of the rod 4 and is packed as at $6^a$ to divide the casing into chambers 11 and 22, respectively. Within the chamber 22 an auxiliary spring 7 is provided, and within the rod 4 a second coil spring 9 is provided to abut the plug 5, and the plunger 8. The spring 9 opposes the spring 7 to a sufficient degree to keep the piston 6 in about the position shown in the drawings. Instead of providing the plug 2 with a threaded countersunk portion $2^c$, such countersunk portion may be omitted and the plug 20 in Fig. 3 be formed with such portion, the plug 20 having an eye $20^a$ corresponding to that $2^a$ of the plug 2. The rod 4 and the casing 1 may contain a suitable amount of lubricant to oil the various parts.

Instead of providing the plunger 8, I may omit the same as shown in Fig. 3, of the drawings, and I may also omit the spring 9, and when this is done, I prefer to insert a plug 12 into the end of the rod 40, and the plug 12 may be provided with small apertures $12^a$ to open communication between the chamber 11 and the interior of the rod 40 to increase the capacity of the air cushion, formed by the air in the chamber 11 and in the rod 40. The rod 40 is threaded at $40^a$ to receive the member 5.

In the practical application of my invention, the spokes are secured to a suitable hub and rim to form a resilient wheel. When the sections 4 and 1 telescope into one another the piston 6 will compress the air in the chamber 11 and the plunger will compress the air in the rod in the form shown in Figs. 1, and 2, and in such forms also the spring 9 will aid the action of the air cushion. In the form shown in Fig. 3 then the air cushion alone acts, and as the air in the chamber 11 is compressed, it will pass through the apertures 12ª into the rod 4 until the pressure in the rod 4 and the chamber 11 is equalized, the passage through the apertures 12ª being slow so as to cause a lagging of the telescoping action of the spoke sections and prevent sudden telescoping of the spoke sections and likewise prevent a sudden action of the spoke sections in the opposite direction.

From the foregoing description, taken in connection with the accompanying drawings, it is thought the complete construction, operation and many advantages of my invention will be readily understood by those skilled in the art to which the invention appertains.

What I claim is:

1. A spoke for vehicle wheels comprising a casing, a tubular rod telescoped into the casing, a packing member carried by the casing and surrounding the rod, a packed piston carried by the rod within the casing to divide the casing into two chambers, a spring in one of said chambers, the other chamber adapted to contain air to serve as an air cushion, said tubular rod having an internal air cushion chamber, a plunger relatively fixed with the casing and projecting within the tubular rod, and a spring within the tubular rod to engage the plunger.

2. A spoke for vehicle wheels comprising a spoke casing, a closure plug for one end of the casing, an adjustable closure plug for the other end of the casing, a hollow rod projecting through said adjustable closure plug into the casing, a packed piston carried by the inner end of said hollow rod, a closure plug for the outer end of said hollow rod, a plunger carried by the first mentioned closure plug of the casing, and projecting within the inner end of said tubular rod, combined with a spring within the casing normally tending to telescope the casing and rod.

3. A spoke for vehicle wheels comprising a spoke casing, a closure plug for one end of the casing, an adjustable closure plug for the other end of the casing, a hollow rod projecting through said adjustable closure plug into the casing, a packed piston carried by the inner end of said hollow rod, a closure plug for the outer end of said hollow rod, a plunger carried by the first mentioned closure plug of the casing, and projecting within the inner end of said tubular rod, combined with a spring within the casing normally tending to telescope the casing and rod, and a spring within the rod normally tending to oppose the action of said telescoping means.

4. A spoke for vehicle wheels comprising a casing, a closure plug for one end of the casing, an adjustable closure plug for the other end of the casing, a hollow rod projecting through said adjustable closure plug into the casing, a packed piston carried by said tubular rod within the casing to divide the casing into an air chamber and a suction chamber, a spring within the suction chamber normally tending to telescope the rod and casing against the action of the air cushion, and a member projected partly within the tubular rod and partly projecting outside of the tubular rod and within the casing.

HARTWIG O. PECK.

Witnesses:
I. S. ARMSTRONG,
W. J. MAKELIM.